US012259669B2

United States Patent

(12) United States Patent
Saeki
(10) Patent No.: US 12,259,669 B2
(45) Date of Patent: Mar. 25, 2025

(54) HEATING DEVICE AND IMAGE PROCESSING APPARATUS INCLUDING HEAT TRANSFER MEMBER CONTACTING A HEATER IN AMOUNTS VARYING WITH POSITION ALONG THE HEATER

(71) Applicant: TOSHIBA TEC KABUSHIKI KAISHA, Tokyo (JP)

(72) Inventor: Ryota Saeki, Sunto Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/979,408

(22) Filed: Nov. 2, 2022

(65) Prior Publication Data

US 2023/0058238 A1 Feb. 23, 2023

Related U.S. Application Data

(63) Continuation of application No. 17/319,358, filed on May 13, 2021, now Pat. No. 11,531,293.

(30) Foreign Application Priority Data

Aug. 3, 2020 (JP) ................................ 2020-131666

(51) Int. Cl.
*G03G 15/20* (2006.01)

(52) U.S. Cl.
CPC ..... *G03G 15/2053* (2013.01); *G03G 15/2042* (2013.01); *G03G 15/2064* (2013.01); *G03G 2215/2038* (2013.01)

(58) Field of Classification Search
CPC .......... G03G 15/2053; G03G 15/2046; G03G 15/2042; G03G 2215/2035
See application file for complete search history.

(56) References Cited

U.S. PATENT DOCUMENTS 10,942,479 B1 3/2021 Sato
2007/0237536 A1 10/2007 Roof
2015/0139708 A1 5/2015 Shimura et al.
(Continued)

FOREIGN PATENT DOCUMENTS

JP 2014126773 A 7/2014
JP 2016029433 A 3/2016
(Continued)

OTHER PUBLICATIONS

English Translation of JP 2020106665.*
(Continued)

*Primary Examiner* — Arlene Heredia
(74) *Attorney, Agent, or Firm* — Kim & Stewart LLP

(57) ABSTRACT

A heating device includes a cylindrical film a heater disposed inside the cylindrical film on an inner surface of the cylindrical film. The heater has a plurality of heating elements that are spaced from each other at intervals along an axial direction. A heat transfer member contacts the heater. The heat transfer member is arranged such that, in a first region of the heater that includes just a single one of the heating elements, contact between the heater and heat transfer member is greater than in a second region of the heater that includes an interval between a pair of adjacent heating elements.

20 Claims, 13 Drawing Sheets

(56) References Cited

U.S. PATENT DOCUMENTS

| | | | | |
|---|---|---|---|---|
| 2016/0098001 | A1* | 4/2016 | Ogawa | G03G 15/2053 399/338 |
| 2017/0363995 | A1 | 12/2017 | Takagi | |
| 2021/0294251 | A1* | 9/2021 | Endo | G03G 15/2042 |

FOREIGN PATENT DOCUMENTS

| | | | |
|---|---|---|---|
| JP | 2016071284 | A | 5/2016 |
| JP | 2016188916 | A | 11/2016 |
| JP | 2017167462 | A | 9/2017 |
| JP | 2017227873 | A | 12/2017 |
| JP | 2019128381 | A | 8/2019 |
| JP | 2020106665 | A | 7/2020 |

OTHER PUBLICATIONS

Japanese Office Action dated Jan. 23, 2024, mailed in counterpart Japanese Application No. 2020-131666, 6 pages (with translation).
Japanese Office Action dated Jul. 2, 2024, mailed in counterpart Japanese Application No. 2020-131666, 11 pages (with translation).

* cited by examiner

HEATING DEVICE AND IMAGE PROCESSING APPARATUS INCLUDING HEAT TRANSFER MEMBER CONTACTING A HEATER IN AMOUNTS VARYING WITH POSITION ALONG THE HEATER

CROSS-REFERENCE TO RELATED APPLICATIONS

This application is a continuation of U.S. patent application Ser. No. 17/319,358, filed on May 13, 2021, which is based upon and claims the benefit of priority from Japanese Patent Application No. 2020-131666, filed on Aug. 3, 2020, the entire contents of each of which are incorporated herein by reference.

FIELD

Embodiments described herein relate generally to a heating device and an image processing apparatus.

BACKGROUND

One type of image processing apparatus is an image forming apparatus that prints an image on a sheet. One type of image forming apparatus includes a heating device to heat toner or another recording agent. The heating serves to fix or fuse the toner or other recording agent to a sheet. However, an uneven temperature distribution produced by such a heating device may cause uneven gloss on the image printed on the sheet.

DETAILED DESCRIPTION

Figure 1:
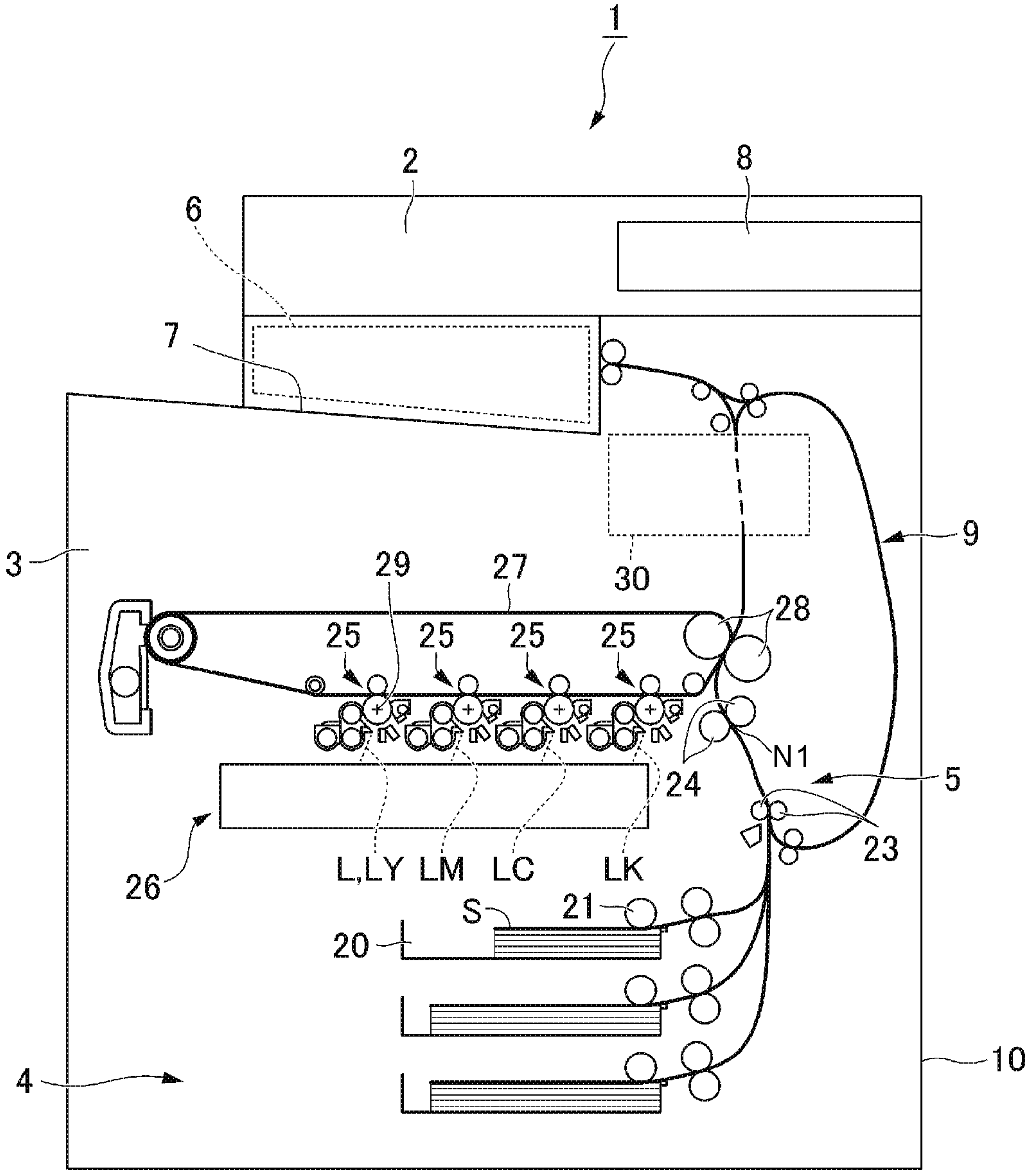
FIG. 1 is a schematic configuration diagram of an image processing apparatus according to an embodiment.

At least one embodiment provides a heating device and an image processing apparatus capable of suppressing unevenness in a temperature distribution of a heating device used in printing of images on sheets and the like.

In general, according to one embodiment, a heating device includes a cylindrical film. A heater is disposed inside a region surrounded by the cylindrical film and contacts an inner surface of the cylindrical film. The heater has a plurality of heating elements on a first surface. The heating elements are spaced from each other at intervals along the axial direction of the cylindrical film. A heat transfer member contacts a second surface of the heater. The second surface of the heater is opposite the first surface. In a cross section orthogonal to the axial direction through a first region of the heater including just a single one of the heating elements, the heat transfer member contacts the second surface for a first length in a direction perpendicular to the axial direction. In a cross section orthogonal to the axial direction through a second region of the heater including an interval between a pair of adjacent heating elements, the heat transfer member contacts the second surface for a second length in the direction perpendicular to the axial direction. The second length is less than the first length.

Hereinafter, certain example embodiments of a heating device and an image processing apparatus incorporating a heating device will be described with reference to the drawings. In the following description, the same reference numerals are given to configurations having the same or similar functions. The descriptions of those configurations or aspects shared in the different embodiments or examples may be omitted after a first description of such configurations or aspects in the context of another embodiment or example.

FIG. 1 is a schematic configuration diagram for an image processing apparatus.

As shown in FIG. 1, the image processing apparatus is an image forming apparatus 1. The image forming apparatus 1 performs the processing for forming an image on a sheet S, which may be a sheet of paper or the like. The image forming apparatus 1 includes a housing 10, a scanner unit 2, an image forming unit 3, a sheet feed unit 4, a conveyance unit 5, a sheet discharge tray 7, a reversing unit 9, a control panel 8, and a control unit 6.

The housing 10 forms the outer shape of the image forming apparatus 1.

The scanner unit 2 reads image information from an object to be copied based on the reflected brightness and darkness of light from the object and generates an image signal accordingly. The scanner unit 2 outputs the generated image signal to the image forming unit 3.

The image forming unit 3 forms an image with a recording agent such as toner based on the image signal received from the scanner unit 2 or an image signal received from an external device. The image forming unit 3 of the present example forms images with toner as the recording agent and the image formed by the image forming unit 3 is thus referred to as a toner image in this context. The image forming unit 3 transfers the toner image onto the surface of the sheet S. The image forming unit 3 heats and presses the toner image on the sheet S to fix the toner image to the sheet S.

The sheet feed unit 4 supplies the sheets S one by one to the conveyance unit 5 at a timing coordinated with the timing at which the image forming unit 3 forms the toner image. The sheet feed unit 4 includes a sheet storage unit 20 and a pickup roller 21.

The sheet storage unit 20 stores sheets S of a predetermined size and type.

The pickup roller 21 picks up the sheets S one by one from the sheet storage unit 20. The pickup roller 21 supplies the sheet S to the conveyance unit 5.

The conveyance unit 5 conveys the sheet S from the sheet feed unit 4 to the image forming unit 3. The conveyance unit 5 includes conveyance rollers 23 and registration rollers 24.

The conveyance rollers 23 convey the sheet S from the pickup roller 21 to the registration rollers 24. The conveyance rollers 23 abut the leading end of the sheet S against a nip N1 formed by the registration rollers 24.

The registration rollers 24 bend or hold the sheet S at the nip N1 to adjust the position of the leading end of the sheet S along the conveyance direction. The registration rollers 24 convey the sheet S according to a timing at which the image forming unit 3 can appropriately transfer the toner image to the sheet S.

The image forming unit 3 includes a plurality of image forming units 25. The image forming unit 3 also includes a laser scanning unit 26, an intermediate transfer belt 27, a transfer unit 28, and a fixing device 30.

Each image forming unit 25 includes a photoconductor drum 29. The image forming unit 25 forms a toner image corresponding to the image signal (received from the scanner unit 2 or another device) on the photoconductor drum 29. The image forming units 25 in this example form toner images with yellow, magenta, cyan, and black toners, respectively.

An electrostatic charger, a developing device, and the like are arranged around the photoconductor drum 29. The electrostatic charger electrostatically charges the surface of the photoconductor drum 29. The developing device stores a developer containing yellow, magenta, cyan, or black toner. The developing device develops an electrostatic latent image on the photoconductor drum 29 by supplying toner. As a result, a toner image of one color is formed on the photoconductor drum 29.

The laser scanning unit 26 scans the electrostatically charged surface of the photoconductor drum 29 with a laser beam L to selectively expose the photoconductor drum 29. The laser scanning unit 26 exposes a photoconductor drum 29 of an image forming unit 25 with one of the respectively different laser beams LY, LM, LC, and LK. As a result, the laser scanning unit 26 forms an electrostatic latent image on each photoconductor drum 29.

The toner image on the surface of the photoconductor drum 29 is then transferred to the intermediate transfer belt 27. This transfer is referred to as a primary transfer.

The transfer unit 28 then transfers the toner image from the intermediate transfer belt 27 onto the surface of the sheet S at a secondary transfer position.

The fixing device 30 heats and presses the toner image that has been transferred to the sheet S to fix the toner image on the sheet S.

The reversing unit 9 can operate to reverse the sheet S to permit an image to be formed on the back surface of the sheet S. The reversing unit 9 inverts a sheet S discharged from the fixing device 30 by switchback. The reversing unit 9 conveys the reversed sheet S back towards the registration rollers 24 for another printing.

A sheet S on which an image has been formed can be discharged onto the sheet discharge tray 7.

The control panel 8 is a part of a user input unit for permitting the inputting of information and instructions by the operator for performing operations of the image forming apparatus 1. The control panel 8 includes a touch panel and various hard keys. The control unit 6 is a controller that controls each unit or sub-component of the image forming apparatus 1.

Figure 2:
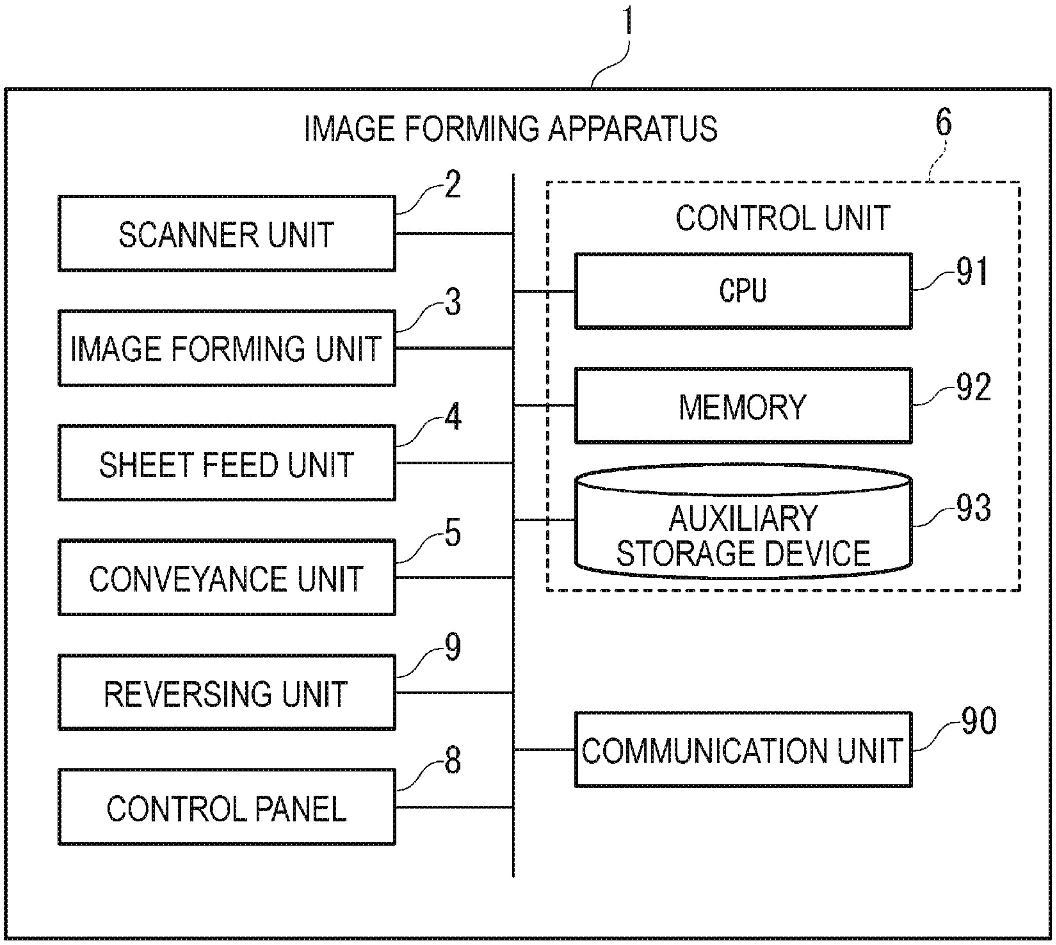
FIG. 2 depicts aspects related to a hardware configuration of an image processing apparatus according to an embodiment.

FIG. 2 depicts a hardware configuration of an image processing apparatus of an embodiment.

As shown in FIG. 2, the image forming apparatus 1 includes a central processing unit (CPU) 91, a memory 92, an auxiliary storage device 93 connected by a bus or the like. The image forming apparatus 1 executes a program and functions as an apparatus including a scanner unit 2, an image forming unit 3, a sheet feed unit 4, a conveyance unit 5, a reversing unit 9, a control panel 8, and a communication unit 90 by executing the program on the CPU 91.

The CPU 91 functions as the control unit 6 when executing the program(s) stored in the memory 92 and the auxiliary storage device 93.

The auxiliary storage device 93 comprises a storage device such as a magnetic hard disk device (HDD) or a semiconductor storage device (SSD). The auxiliary storage device 93 stores information.

The communication unit 90 incorporates a communication interface for connecting to an external device. The communication unit 90 communicates with external devices via the communication interface.

Figure 3:
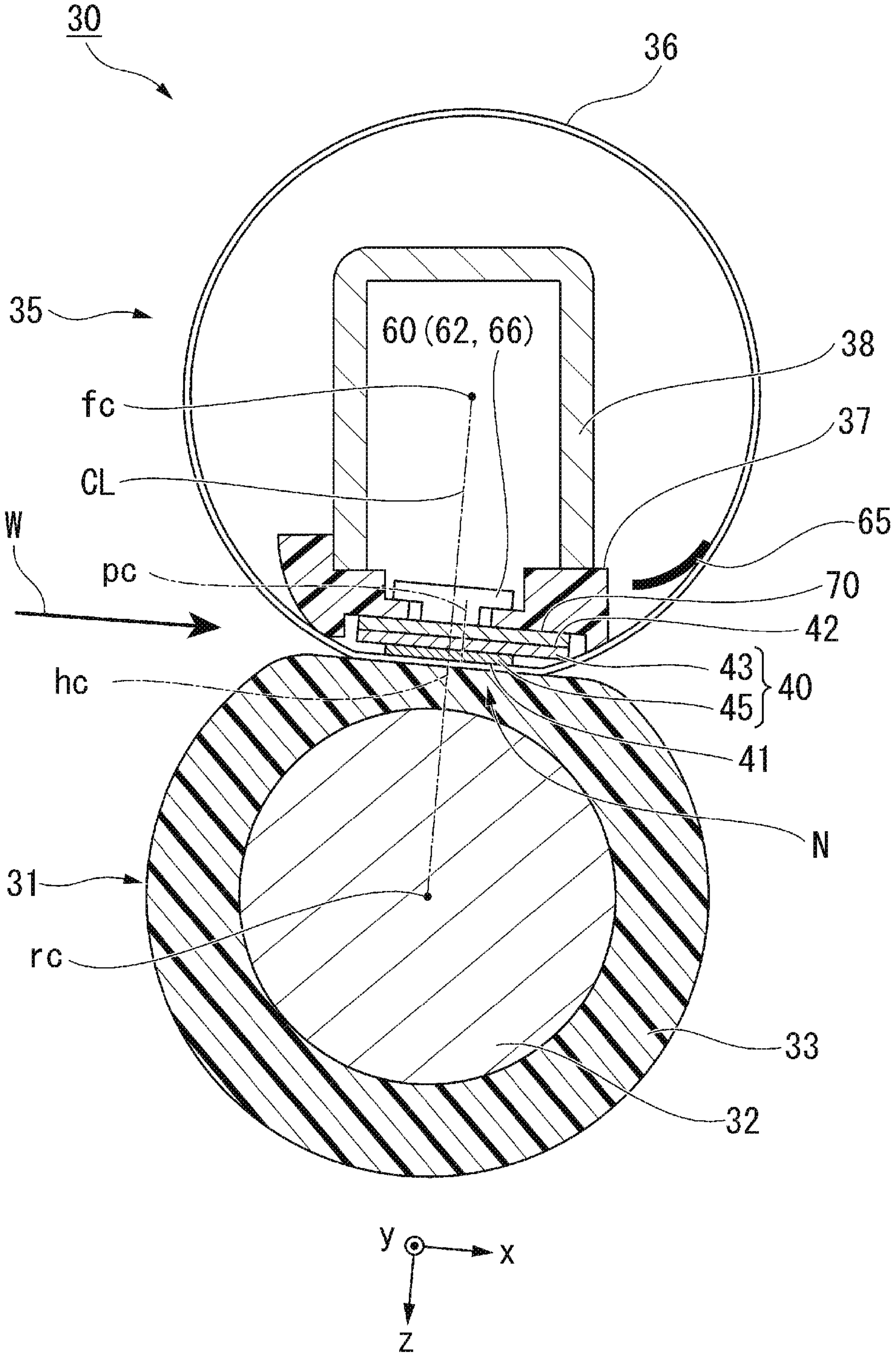
FIG. 3 is a cross-sectional view of a heating device according to an embodiment.

FIG. 3 is a cross-sectional view of a heating device of an embodiment.

As shown in FIG. 3, the heating device of the embodiment is a fixing device 30. The fixing device 30 includes a pressure roller 31 and a film unit 35.

The pressure roller 31 forms a nip N with the film unit 35. The pressure roller 31 presses the toner image of the sheet S in the nip N. The pressure roller 31 rotates and conveys the sheet S through the nip N. The pressure roller 31 includes a core metal 32, an elastic layer 33, and a release layer (not separately depicted).

The core metal 32 is a columnar shape (e.g., a rod shape) and formed of a metal such as stainless steel. Both axial ends of the core metal 32 supported in a manner permitting rotation about the axial direction. The core metal 32 is rotationally driven by a motor. The core metal 32 comes into contact with a cam member. The cam member can rotate to cause the core metal 32 to approach or separate from the film unit 35.

The elastic layer 33 is formed of an elastic material such as silicone rubber. In this example, the elastic layer 33 is formed with a constant thickness on the outer peripheral surface of the core metal 32.

The release layer is formed of a resin material such as PFA (tetrafluoroethylene/perfluoroalkyl vinyl ether copolymer). The release layer is formed on the outer peripheral surface of the elastic layer 33 in this example.

The hardness of the outer peripheral surface of the pressure roller 31 is preferably 40° to 70° under a load of 9.8 N as measured with an ASKER-C hardness tester. As a result, the area of the nip N and the durability of the pressure roller 31 are ensured.

The pressure roller 31 can approach and separate from the film unit 35 by rotation of the cam member. When the pressure roller 31 is brought close to the film unit 35 and pressed by a pressure spring, the nip N is formed. On the other hand, when a sheet S is jammed in the fixing device 30, the sheet S can be removed by separating the pressure roller 31 from the film unit 35. Furthermore, when the tubular film 36 is to be stopped from rotating for a prolonged time, such as during a device sleep or idle state, the pressure roller 31 can be separated from the film unit 35 to prevent plastic deformation of the tubular film 36.

The pressure roller 31 is rotationally driven by a motor and rotates on its axis. When the pressure roller 31 rotates while the nip N is formed, the tubular film 36 of the film unit 35 is driven to rotate by the rotation of the pressure roller 31. The pressure roller 31 rotates so that the sheet S is conveyed in a conveyance direction W through the nip N.

The film unit 35 heats the toner image of the sheet S that entered the nip N. The film unit 35 includes a tubular film 36, a heater unit 40, a heat transfer member 70, a support member 37, a stay 38, a temperature sensing element 60, and a film thermometer 65.

The tubular film 36 is formed in a tubular shape. The tubular film 36 includes a base layer, an elastic layer, and a release layer in this order from the inner peripheral side. The base layer is a material such as polyimide formed into a tubular shape. The elastic layer is laminated on the outer peripheral surface of the base layer. The elastic layer is formed of an elastic material such as silicone rubber. The release layer is laminated on the outer peripheral surface of the elastic layer. The release layer is formed of a material such as PFA resin.

Figure 4:
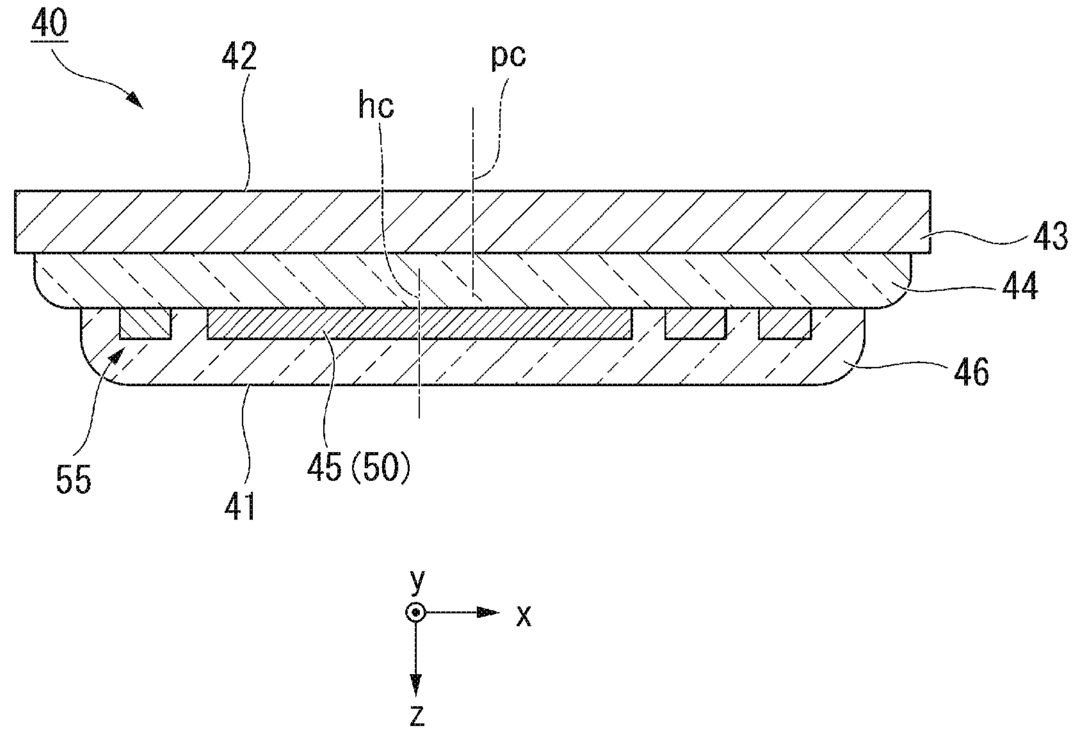
FIG. 4 is a cross-sectional view of a heater unit.
Figure 5:
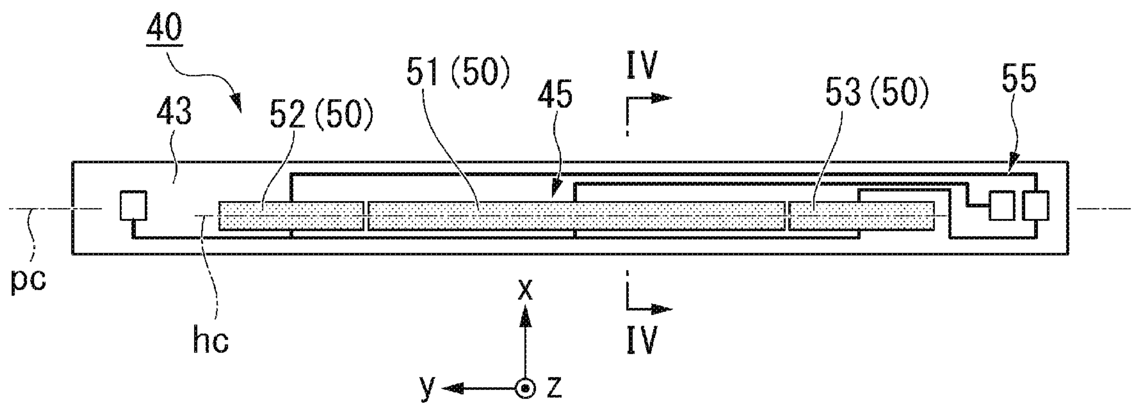
FIG. 5 is a bottom view of a heater unit.

FIG. 4 is a cross-sectional view of the heater unit taken along the line IV-IV of FIG. 5. FIG. 5 is a bottom view (viewed from the +z direction) of the heater unit.

As shown in FIGS. 4 and 5, the heater unit 40 includes a substrate 43, a heating element group 45, and a wiring group 55.

The substrate 43 is formed of a metal such as stainless steel or a ceramic such as aluminum nitride. The substrate 43 is an elongated rectangular plate. The substrate 43 is disposed on to inside the tubular film 36 in the radial direction. That is, the substrate 43 is disposed within the interior region surrounded by the tubular film 36. The axial direction of the tubular film 36 corresponds to the longitudinal direction of the substrate 43.

In the present description, the x direction, the y direction, and the z direction are defined as follows with respect to the figures. The y direction is the longitudinal direction of the substrate 43. The +y direction is the direction from a second end heating element 53 to a first end heating element 52. The x direction is the lateral (planar width) direction of the substrate 43, and the +x direction is the conveyance direction (downstream direction) for the sheet S. The z direction is the thickness direction of the substrate 43. The +z direction is the direction in which the heating element group 45 is arranged with respect to the substrate 43. The first surface 41 of the heater unit 40 faces towards the +z direction. The first surface 41 is in contact with inner surface of the tubular film 36. The −z direction is the direction opposite to the +z direction. The di second surface 42, which is in contact with the heat transfer member 70, 40 faces towards the −z direction. An insulating layer 44 is formed on the +z direction surface side of the substrate 43 of a glass material or the like. The −z direction surface side of the substrate 43 is the second surface 42 of the heater unit 40. The second surface 42 is formed in a planar and orthogonal to the z direction.

As shown in FIG. 5, the heating element group 45 is arranged on the substrate 43. The heating element group 45 is formed of a material such as a silver/palladium alloy disposed on the substrate 43 by screen printing. The overall outer shape of the heating element group 45 as a whole is a rectangular shape with the y direction as the longitudinal direction and the x direction as the lateral direction. The center he of the heating element group 45 along the x direction is offset in the −x direction from the center pc of the substrate 43 along the x direction. The center pc can also be taken as the center or midpoint of the heater unit 43 along the x direction.

The heating element group 45 comprises a plurality of heating elements 50 provided at intervals along the y direction of the substrate 43. The plurality of heating elements 50 are arranged in a row along the y direction. In this example embodiment, seven individual heating elements 50 are provided. The plurality of heating elements 50 includes the first end heating element 52, a plurality of central heating elements 51, and the second end heating element 53. However, in FIG. 5, for simplicity, the plurality of central heating elements 51 are collectively shown as a single heating element 50. The central heating elements 51 are arranged on the central portion of the heating element group 45 in the y direction. In this example, the plurality of central heating elements 51 are electrically connected in parallel. The first end heating element 52 is on the +y direction side of the plurality of central heating elements 51. That is, the first end heating element 52 is arranged at the +y direction end of the heating element group 45. The second end heating element 53 is on the −y direction side of the plurality of central heating elements 51. That is, the second end heating element 53 is arranged at the −y direction end of the heating element group 45. The first end heating element 52 and the second end heating element 53 are electrically connected in parallel.

The heating element group 45 generates heat when supplied with electric power (energized). A sheet S having a relatively small width in the y direction may pass through just the central portion of the fixing device 30. In such a case, the control unit 6 can be configured to generate heat using only the central heating elements 51. On the other hand, the control unit 6 can be configured to generate heat using the entire heating element group 45 when the sheet S has a width in the y direction that exceeds the central portion of the fixing device 30. Therefore, in the present example, the central heating element (s) 51 are controlled to generate heat independently from the first end heating element 52 and the second end heating element 53. Furthermore, in this example, the first end heating element 52 and the second end heating element 53 are controlled to generate heat in the same manner as one another.

As shown in FIG. 4, the heating element group 45 and the wiring group 55 are formed on the surface of the insulating layer 44 on the +z direction side. A protective layer 46 is formed of a glass material or the like so as to cover the heating element group 45 and the wiring group 55. The protective layer 46 improves the slidability (reduces friction) between the heater unit 40 and the tubular film 36.

Similar to the insulating layer 44, an insulating layer may also be formed on the −z direction side of the substrate 43. Similar to the protective layer 46, another protective layer may be formed on the −z direction side of the substrate 43. By matching protective and insulating layers on both sides of the substrate 43, warping of substrate 43 can be suppressed or avoided.

As shown in FIG. 3, the heater unit 40 is arranged inside the tubular film 36. Typically, a grease or similar lubricant is applied to the inner peripheral surface of the tubular film 36. The first surface 41 comes into contact with the inner peripheral surface of the tubular film 36 via the grease or the like. When the heater unit 40 generates heat, the viscosity of the grease decreases. As a result, the slidability between the heater unit 40 and the tubular film 36 is improved (friction is reduced).

As depicted in FIG. 3, a straight line CL connecting the center rc of the pressure roller 31 and the center fc of the film unit 35 is defined. The center pc of the substrate 43 is offset in the +x direction from the straight line CL. The center he of the heating element group 45 is on the straight line CL. The heating element group 45 is entirely contained within the region of the nip N and overlaps the center of the nip N. As a result, the heat distribution of the nip N becomes more uniform, and a sheet S passing through the nip N will be heated evenly.

The heat transfer member 70 is formed of a metal material having high thermal conductivity such as copper or aluminum, a graphite sheet, or the like. The outer planar shape of the heat transfer member 70 is substantially the same as the outer planar shape of the substrate 43. The heat transfer member 70 is arranged to be in contact with at least a part of the second surface 42.

The support member 37 can be formed of a resin material such as a liquid crystal polymer. The support member 37 is arranged so as to cover or overlap the −z direction surface of the heater as well as both x direction ends of the heater unit 40. The support member 37 supports the heater unit 40 via the heat transfer member 70 therebetween in the z direction. Both outer x direction ends of the support member 37 are rounded or chamfered. The x direction ends of the support member 37 rest on and support the inner peripheral surface of the tubular film 36.

When a sheet S passing through the fixing device 30 is heated, a temperature distribution can be generated in the heater unit 40 according to the size of the sheet S. When a portion of the heater unit 40 becomes locally hot during heating, the local temperature may exceed the heat resistance temperature of the support member 37, which is made of a resin material. The heat transfer member 70 functions to average the temperature distribution across the heater unit 40 to avoid localized hotspots. As a result, the support member 37 can avoid being overheated beyond its heat resistance temperature.

The stay 38 is formed of a steel plate material or the like. The cross section of the stay 38 perpendicular to the y direction is formed in a U shape. The stay 38 is mounted on the −z direction side of the support member 37. The U-shaped opening is thus closed by the support member 37. The stay 38 extends in the y direction. Both ends of the stay 38 in the y direction can be fixed to the housing or the like of the image forming apparatus 1. As a result, the film unit 35 is supported by the image forming apparatus 1. The stay 38 improves (increases) the bending rigidity of the film unit 35. A flange for restricting the movement of the tubular film 36 in the y direction can be mounted near both y direction ends of the stay 38.

The temperature sensing element 60 is on the −z direction side of the heater unit 40. In this example, the temperature sensing element 60 is arranged on the −z direction surface of the heat transfer member 70. The temperature sensing element 60 or a portion thereof is disposed inside a hole that penetrates the support member 37 in the z direction. The wiring of the temperature sensing element 60 can be led out from the hole in the −z direction. The temperature sensing element 60 includes a heater thermometer 62 and a thermostat 66. For example, the heater thermometer 62 is a thermistor.

Figure 6:
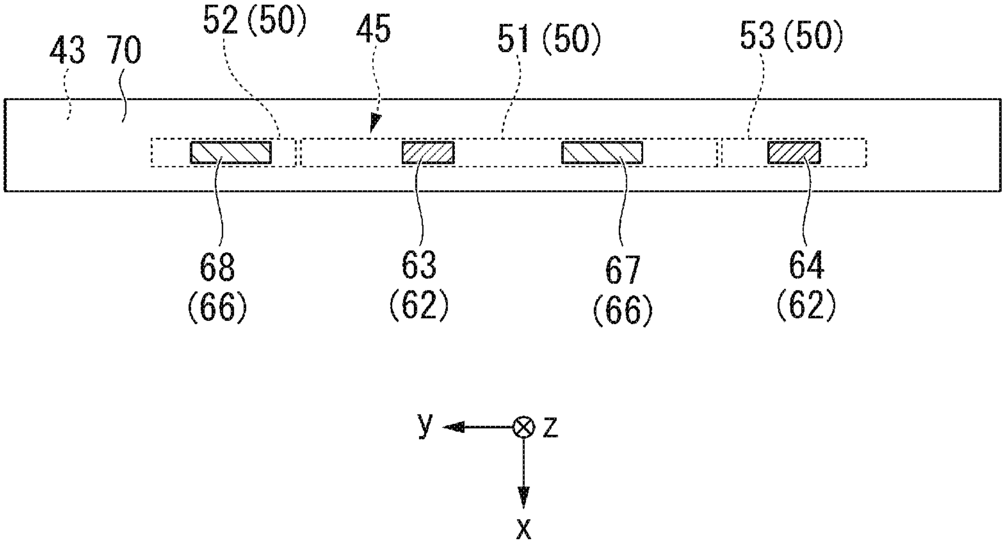
FIG. 6 is a plan view depicting positional aspects of a heater thermometer and a thermostat.

FIG. 6 is a plan view (viewed from the −z direction) of the heater thermometer 62 and the thermostat 66. In FIG. 6, the depiction of the support member 37 is omitted.

As shown in FIG. 6, the heater thermometer 62 includes a central heater thermometer 63 and an end heater thermometer 64. The thermostat 66 includes a central thermostat 67 and an end thermostat 68. The central heater thermometer 63 and the central thermostat 67 are arranged on the −z direction side of the central heating element 51. The end heater thermometer 64 and the end thermostat 68 are arranged on the −z direction side of the first end heating element 52 and the second end heating element 53.

In this example, the heater thermometer 62 detects the temperature of the heater unit 40 via the heat transfer member 70.

The control unit 6 (see FIG. 1) detects or measures the temperature of the heating element group 45 using the heater thermometer 62 when the fixing device 30 is initially started (at startup or a return from an idle or sleep state). When the temperature of the heating element group 45 is lower than a predetermined temperature, the control unit 6 causes the heating element group 45 to generate heat for a short time. After that initial heating, the control unit 6 begins the rotation of the pressure roller 31. Due to the heat generated by the heating element group 45 at startup or the like, the viscosity of the grease applied to the inner peripheral surface of the tubular film 36 decreases. As a result, the slidability between the heater unit 40 and the tubular film 36 at the start of rotation of the pressure roller 31 is improved (friction is reduced).

In this example, the heater thermometer 62 detects the temperature of the heat transfer member 70.

The control unit 6 detects or measures the temperature of the heat transfer member 70 with the heater thermometer 62 during the operation of the fixing device 30. The control unit 6 controls the energization of the heating element group 45 based on the temperature measurement results. As a result, the temperature of the heat transfer member 70, which is in contact with the support member 37, can be maintained below the heat resistant temperature of the support member 37.

The thermostat 66 cuts off the power to the heating element group 45 when the temperature of the heater unit 40 (detected via the heat transfer member 70) exceeds some predetermined temperature. As a result, excessive heating of the tubular film 36 by the heater unit 40 can be avoided.

As shown in FIG. 3, the film thermometer 65 comes into contact with the inner peripheral surface of the tubular film 36. In this example, the film thermometer 65 detects the temperature of the tubular film 36.

The control unit 6 detects or measures the temperatures of the central portion and an end of the tubular film 36 during the operation of the fixing device 30. The control unit 6 controls the energization of the central heating element 51 based on the temperature measurement result for the central portion of the tubular film 36. The control unit 6 controls energization of both the first end heating element 52 and the second end heating element 53 based on the temperature measurement result for one y direction end portion of the tubular film 36.

First Embodiment

The shape of the heating element group 45 of the first embodiment will be described.

Figure 7:
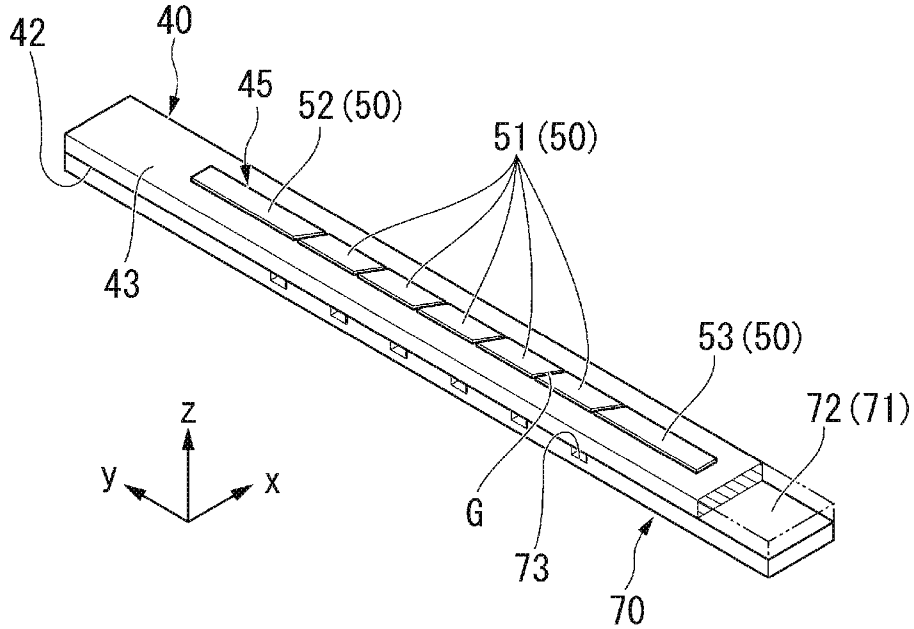
FIG. 7 is a perspective view of a heater unit and a heat transfer member according to a first embodiment.
Figure 8:
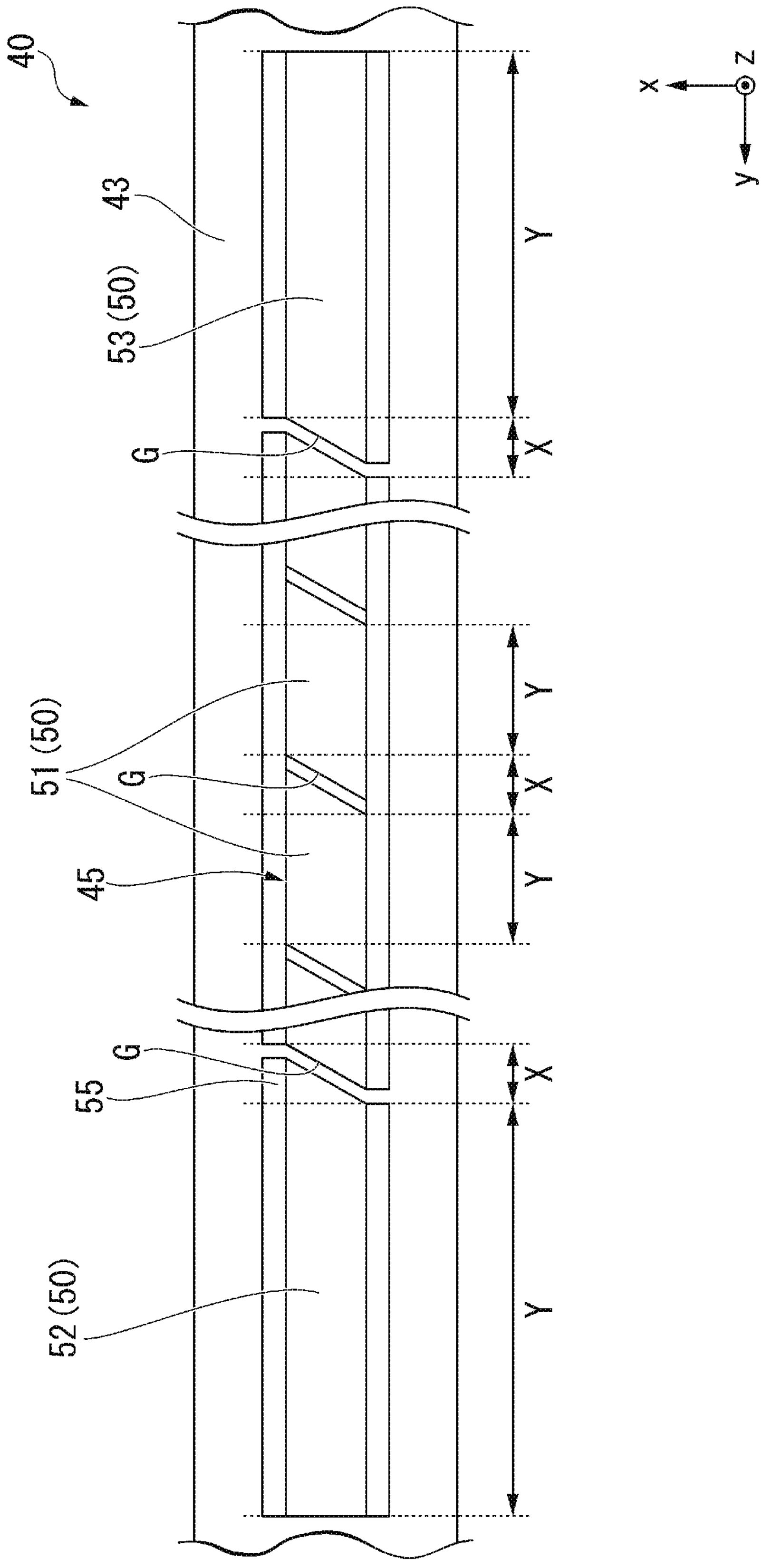
FIG. 8 is a bottom view of a heater unit.

FIG. 7 is a perspective view of the heater unit 40 and the heat transfer member 70 according to the first embodiment. FIG. 8 is a bottom view showing the heater unit 40 according to the first embodiment. In FIG. 7, the insulating layer 44, the protective layer 46, and the wiring group 55 is omitted from the depiction. Furthermore, in FIG. 8, the insulating layer 44 and the protective layer 46 are additionally omitted from the depiction.

As shown in FIGS. 7 and 8, the plurality of heating elements 50 are arranged so that the +x direction edges overlap with −x direction edges of an adjacent (in the y direction) heating element 50. The heating element group 45 is overall formed in a rectangular shape with the y direction as the longitudinal direction, but boundaries between adjacent heating elements 50 are not perpendicular to the y direction.

The outer planar shape of the central heating elements 51 is formed as a parallelogram in which a pair of sides extend in the y direction and the remaining pair of sides extend in a direction inclined with respect to the x direction when seen in a plan view from the z direction. The plurality of central heating elements 51 can be formed to have the same shape and the same size as each other. However, in some examples, the central heating elements 51 may be formed so that the dimensions in the y direction of some or all are different from one another. The +x-direction edge of each central heating element 51 is connected to a wiring of the wiring group 55. The edge of each central heating element 51 in the −x direction is connected to a wiring of the wiring group 55. The wiring connected to the +x direction edge of each central heating element 51 extends along the y direction and is integrated with the +x direction edge wiring of the other heating elements 50 to form a common connection wiring. The wirings connected the −x direction edge of each central heating element 51 extends along the y direction and are likewise integrated with one another. As a result, the central heating elements 51 are electrically connected in parallel with each other.

The outer planar shape of the first end heating element 52 is a trapezoidal shape having a pair of bases (+/−x direction edges) and a pair of legs (+/−y direction edges) in a plan view. The pair of bases extend in parallel with the y direction. The leg on the central heating element 51 side (−y direction end) extend in a direction inclined with respect to the x direction corresponding to the outer shape of the central heating element 51 adjacent to the first end heating element 52. The leg on the +y direction end extends parallel to the x direction in this example. The +x direction edge and the −x direction edge of the first end heating element 52 are respectively connected to wirings of the wiring group 55.

The outer planar shape of the second end heating element 53 is a trapezoidal shape having a pair of bases (+/−x direction edges) and a pair of legs (+/−y direction edges) in a plan view. The pair of bases extend in parallel with the y direction. The leg on the central heating element 51 side (+y direction end) extends in a direction inclined with respect to the x direction corresponding to the outer shape of the central heating element 51 adjacent to the second end heating element 53. The leg on the −y direction end extends parallel to the x direction in this example. The +x direction edge and the −x direction edge of the second end heating element 53 are respectively connected to the wiring of the wiring group 55.

In some examples, the heating element 50 may have the above-described general outer planar shape, but details of the structure inside the outer planar shape is not particularly limited to a solid filing of the overall outline of the planar shape. A heating element 50 may be formed by material in extending or arranged in a zigzag shape or other pattern so as to fill the inside of the described outline.

As depicted in FIG. 8, an interval G (gap) is left between the pairs of adjacent heating elements 50. The interval G extends in a direction inclined with respect to the x direction and has a constant width in this example. The interval G between a pair of heating elements 50 extends so that the +x direction end and the −x direction end do not overlap one another when viewed from the x direction. As a result, the adjacent pair of heating elements 50 also overlap each other when viewed from the x direction. The intervals G extend in parallel with each other in this example. The individual intervals G are formed so as not to overlap each other when viewed from the x direction. In the present embodiment, the plurality of intervals G are formed to have the same shape and the same size. However, the plurality of intervals G may be formed so that, for example, the width and the inclination direction of different intervals G are different.

In the following description, the region of which the heating element group 45 in which an interval G is formed between a pair of adjacent heating elements 50 is referred to as a first region X. A region of a heating element 50 directly adjacent to and continuous with a first region X in they direction and is referred to as a second region Y. The second regions Y are portions of a heating element 50 which do not overlap with another heating element 50 when viewed from the x direction. In the present embodiment, the second region Y is a region in which the heating element 50 extends along the y direction at a constant width (dimension in the x direction).

The heat transfer member 70 of the first embodiment will be described.

As shown in FIG. 7, the heat transfer member 70 is arranged on the side opposite to the heating element group 45 with the substrate 43 interposed therebetween. The heat transfer member 70 has a facing surface 71 facing the heater unit 40. The facing surface 71 faces in the +z direction. The facing surface 71 is formed in a plane orthogonal to the z direction. The facing surface 71 is formed in a rectangular shape with the y direction as the longitudinal direction. The facing surface 71 overlaps the entire heating element group 45 when viewed from the z direction. In the present embodiment, the heat transfer member 70 is formed to have the same shape and size as the substrate 43 of the heater unit 40 when viewed from the z direction. Further, the facing surface 71 is formed to have the same overall shape and size as the second surface 42 of the heater unit 40.

Figure 9:
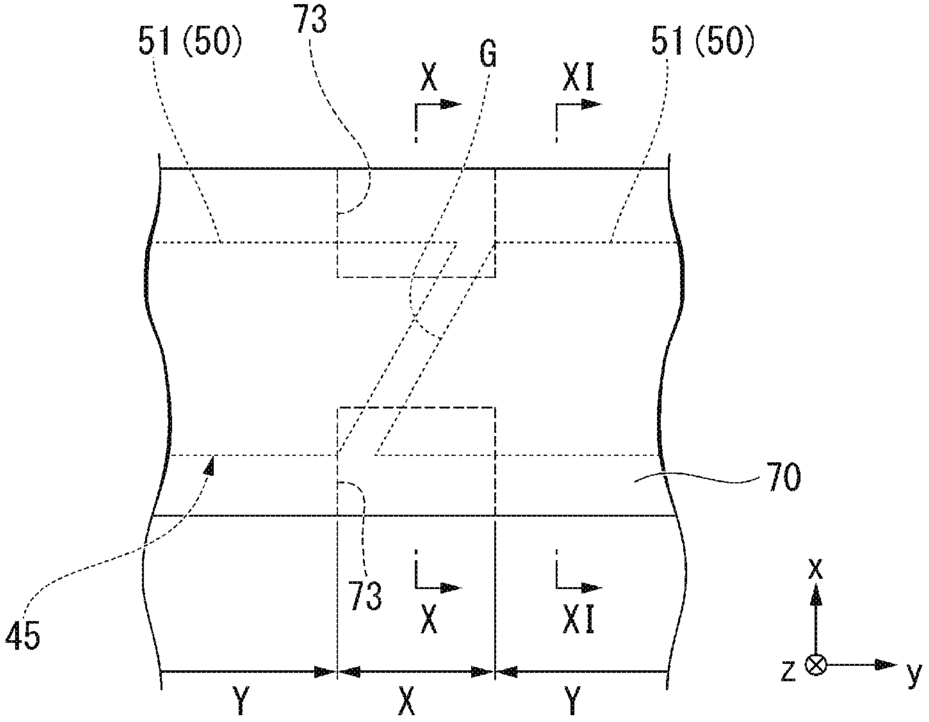
FIG. 9 is a plan view showing a part of a heater unit and a heating element according to a first embodiment.
Figure 10:
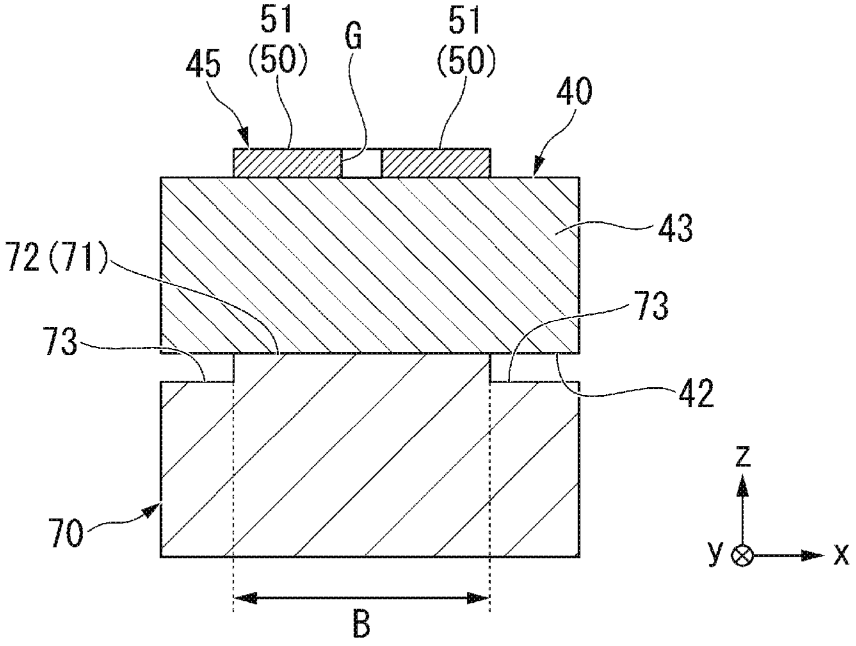
FIG. 10 is a cross-sectional view taken along the line X-X of FIG. 9.
Figure 11:
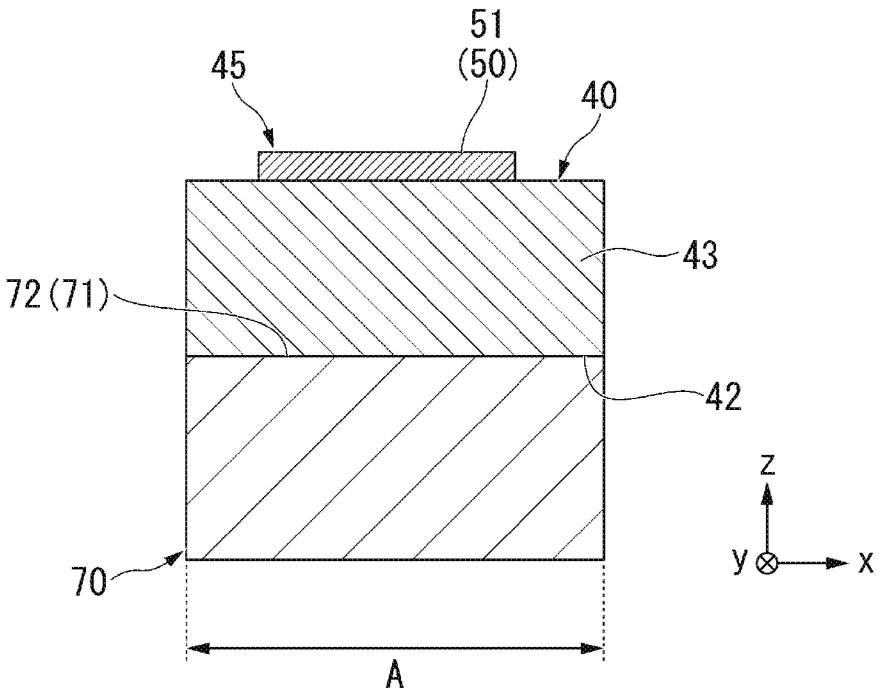
FIG. 11 is a cross-sectional view taken along the line XI-XI of FIG. 9.

FIG. 9 is a plan view showing a part of the heater unit 40 and the heating elements 50 according to the first embodiment. FIG. 10 is a cross-sectional view taken along the line X-X of FIG. 9. FIG. 11 is a cross-sectional view taken along the line XI-XI of FIG. 9.

As shown in FIGS. 9 to 11, the facing surface 71 of the heat transfer member 70 includes a contact surface 72 and a recess 73. The contact surface 72 comes into surface contact with the second surface 42 of the heater unit 40. The contact surface 72 may be in direct contact with the second surface 42 or may be in contact with the second surface 42 via thermal grease, paste, or the like. The contact surface 72 is positioned so as to correspond to the entirety of the second regions Y between both x direction edges of the facing surface 71. The contact surface 72 overlaps the entire heating element 50 in the second region Y when viewed from the z direction. The recess 73 is adjacent to the contact surface 72. The recess 73 is recessed in the −z direction so as to avoid contact with the heater unit 40. Each recess 73 is provided in a first region X. A separate recess 73 is provided at both the x direction sides of the first regions X. Each recess 73 is open on the side surface of the heat transfer member 70 in the x direction. Each recess 73 has a rectangular opening on the facing surface 71. The recess 73 overlaps the second surface 42 of the heater unit 40 in a plan view. The recess 73 overlaps the heating element 50 in a plan view. The y-direction edge (sidewall) of each recess 73 is located at a y-direction edge boundary of a first region X.

The heat transfer member 70 is in contact with the second surface 42 of the heater unit 40 with a constant first length A in a zx cross section orthogonal to the y direction in the entire second region Y. The heat transfer member 70 is in contact with the second surface 42 of the heater unit 40 with a constant second length B in the zx cross section in the entire first region X. The second length B is shorter than the first length A. Specifically, for example, among the contact lengths of the heater unit 40 and the heat transfer member 70 in the zx cross section, the longest contact length in the first region X is shorter than the shortest contact length in the second region Y. Due to the above relationship, the heat transfer member 70 is in contact with the heater unit 40 in the second region Y at a first contact area ratio. The heat transfer member 70 is in contact with the heater unit 40 in the first region X at a second contact area ratio that is less than the first contact area ratio. The contact area ratio is the ratio of the contact area between the heat transfer member 70 and the heater unit 40 per unit area.

FIGS. 9 to 11 show the peripheral structure of the interval G between a pair of adjacent central heating elements 51 among the plurality of heating elements 50. However, the above configuration is applicable to all or part of the peripheral structure of the intervals G between any pair of adjacent heating elements 50 in the example.

Figure 12:
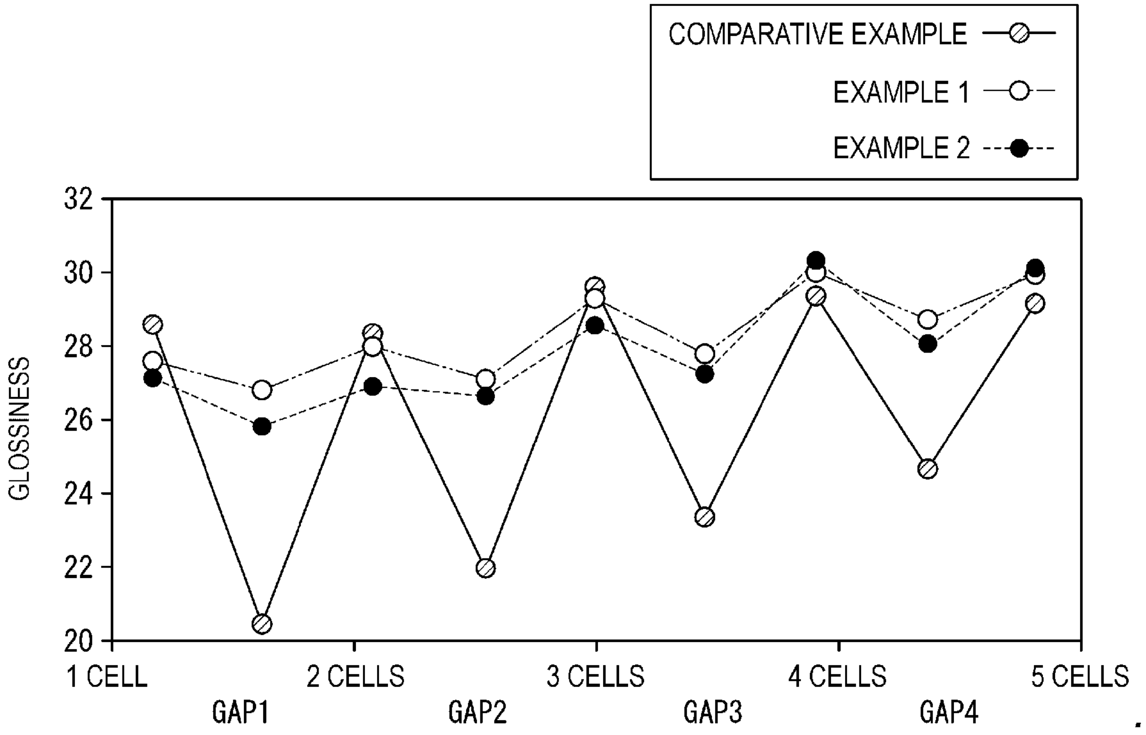
FIG. 12 is a graph depicting values for glossiness of an image on a sheet printed by an image forming apparatus of various examples.

FIG. 12 is a graph showing the glossiness of an image on a sheet printed by an image forming apparatus. A solid image was formed on the entire printing surface of the sheet S using the fixing devices of certain examples including a comparative example. The glossiness of the image was measured with a glossiness measuring device. In the fixing device of the comparative example, a recess was not formed in the heat transfer member 70. In the fixing device of Example 1, a recess 73 of the first embodiment is formed in the heat transfer member 70. In the fixing device of Example 2, the heat transfer member 70 is formed with a penetrating portion 80 of a second embodiment (described further below).

In FIG. 12, the horizontal axis indicates the image position on a sheet S along the y direction as passed through the fixing device. The label "1 cell" on the horizontal axis corresponds to the position of a central heating element 51 arranged in the most +y direction end among the plurality of central heating elements 51. The label "5 cells" on the horizontal axis corresponds to the position of a central heating element 51 arranged in the most −y direction end among the plurality of central heating elements 51. That is, each increment from 1 cell to from "1 cell" to "5 cells" on the horizontal axis corresponds to a second region Y. The labels "GAP1" to "GAP4" on the horizontal axis are positions of intervals G between the adjacent central heating elements 51. Thus, each label "GAP1" to "GAP4" respectively corresponds to a first region X.

As shown in FIG. 12, in the fixing device of the comparative example, the portion of the image on the sheet S passed through one of the first regions X has a lower glossiness than the portion of the image passed through one of the second regions Y. As a result, the image on the sheet S from the comparative example has uneven gloss.

On the other hand, in the fixing device of Example 1, the decrease in the glossiness of the first region X with respect to the glossiness of the second region Y is suppressed as compared with the fixing device of the comparative example. As a result, the uneven gloss of the image on the sheet S from Example 1 is suppressed.

As described above, the fixing device 30 includes the heater unit 40 including the heating element group 45, and the heat transfer member 70 in contact with the heater unit 40. The heating element group 45 includes a plurality of heating elements 50 provided at intervals along the y direction. The heating element group 45 has an interval G between at least one pair of adjacent heating elements 50 among the plurality of heating elements 50 in the first region X. The heating elements 50 do not overlap with each other in the second regions Y between adjacent first regions X. Therefore, since the interval G between a pair of heating elements 50 is in the first region X, there is a difference in heat generation by the heater unit 40 in the first regions X and the second regions Y.

However, the heat transfer member 70 contacts the heater unit 40 with a first length A in the zx cross section in the second region Y. The heat transfer member 70 contacts the heater unit 40 in the zx cross section in the first region X with a second length B shorter than the first length A. According to this configuration, the contact area of the heat transfer member 70 is reduced in the first region X as compared with a configuration in which a heat transfer member simply evenly contacts with the heater unit 40 over the entire area. Therefore, the heat transfer from the heater unit 40 to the heat transfer member 70 is reduced in the first region X, where the degree of heat generation of the heater unit 40 is relatively small, as compared to the second region Y. Therefore, the temperature of the heater unit 40 can be made more uniform during the initial stage of heating by the heater unit 40 in which the temperature difference between the heater unit 40 and the heat transfer member 70 is relatively large. Therefore, it is possible to suppress the occurrence of an uneven temperature distribution of the heater unit 40.

A pair of adjacent heating elements 50 overlap each other when viewed from the x direction. With this configuration, there is no region in which at least one heating element 50 is not provided along the y direction. As a result, the occurrence of an uneven temperature distribution of the heater unit 40 can be additionally suppressed.

The heat transfer member 70 includes the recesses 73 in the first regions X adjacent to the contact surface 72. According to this configuration, by providing the recesses 73, the contact between the heater unit 40 and the heat transfer member 70 on the zx cross section passing through the recesses 73 can be reduced (length dimension of the contact surface in the x direction is reduced). Therefore, the above-mentioned effects can be obtained.

Further, the volume of the heat transfer member 70 can be increased as compared with a configuration in which the heat transfer member 70 is provided with a penetrating portion instead of the recess 73. Therefore, the strength of the heat transfer member 70 can be ensured.

Certain modifications of the first embodiment will be described. In general, the aspects other than those described below for a modification can be considered to be the same as those already described for the first embodiment.

Figure 13:
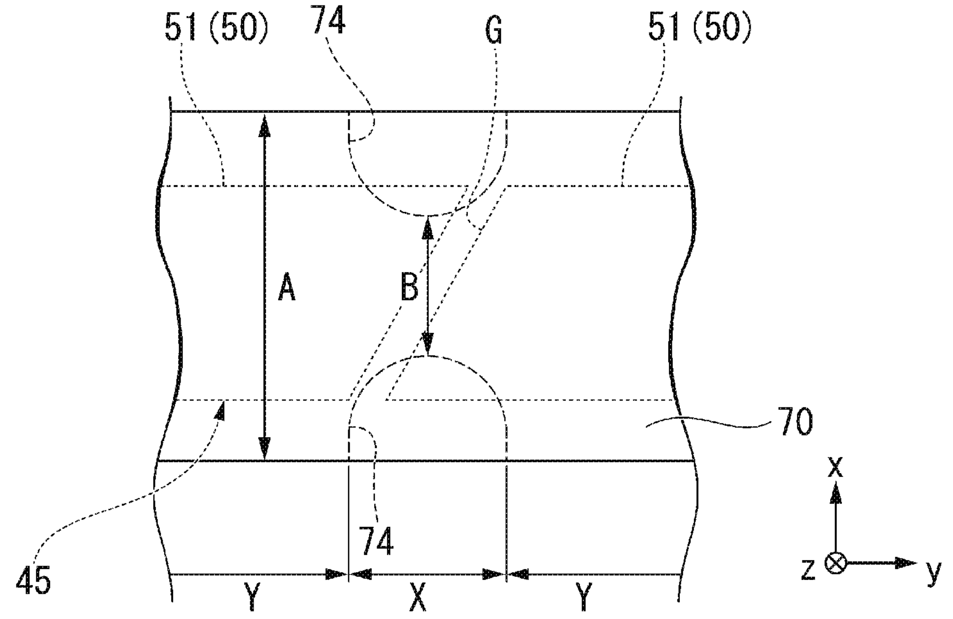
FIG. 13 is a plan view showing a part of a heater unit and a heating element according to a first modification of the first embodiment.

FIG. 13 is a plan view showing a part of a heater unit and the heating elements according to a first modification of the first embodiment.

The heat transfer member 70 of the first modification is formed with a pair of recesses 74 instead of the pair of recesses 73 of the first embodiment. The recess 74 is provided in just the first regions X. The recess 74 is opened in a semi-elliptical shape on the facing surface 71. The recess 74 overlaps the heating element 50 in a plan view. The y-direction end of each recess 74 is located at the y-direction end of the first region X. As a result, the heat transfer member 70 is in contact with the heater unit 40 in the zx cross section in the entire first region X with the second length B shorter than the first length A, as in the first embodiment. The second length B changes in a range shorter than the first length A depending on the position in the y direction. According to this configuration, the same effect as that of the first embodiment can be obtained.

Figure 14:
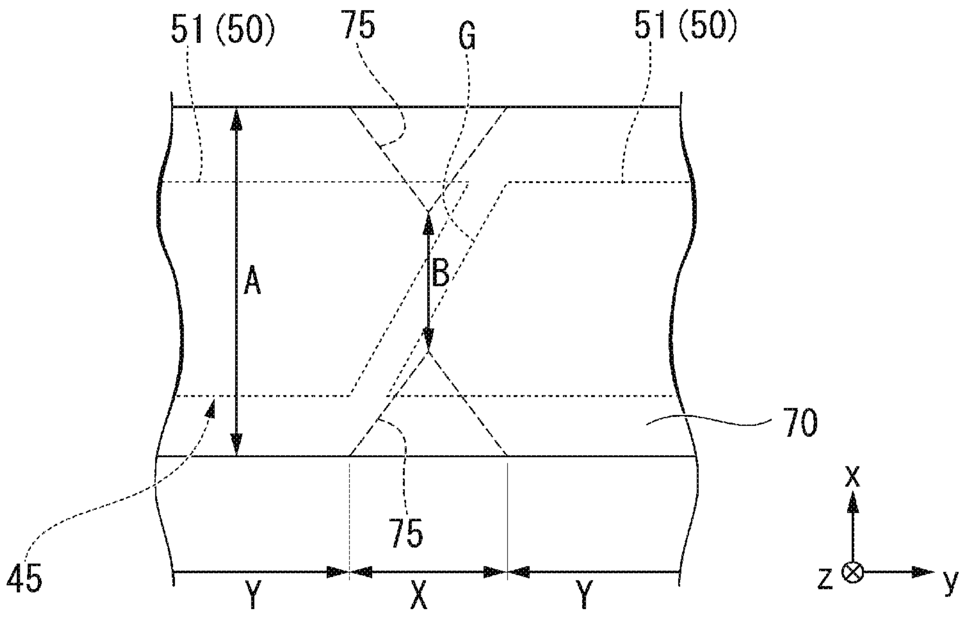
FIG. 14 is a plan view showing a part of a heater unit and a heating element according to a second modification of the first embodiment.

FIG. 14 is a plan view showing a part of a heater unit and the heating elements according to a second modification of the first embodiment.

The heat transfer member 70 of the second modification is formed with a pair of recesses 75 instead of the pair of recesses 73 of the first embodiment. The recess 75 is provided in just the first regions X. The recess 75 is opened in a triangular shape on the facing surface 71. The recess 75 overlaps the heating element 50 in a plan view. The y-direction end of each recess 75 is located at the y-direction end of the first region X. As a result, the heat transfer member 70 is in contact with the heater unit 40 in the zx cross section in the entire first region X with the second length B shorter than the first length A, as in the first embodiment. According to this configuration, the same effect as that of the first embodiment is obtained.

Figure 15:
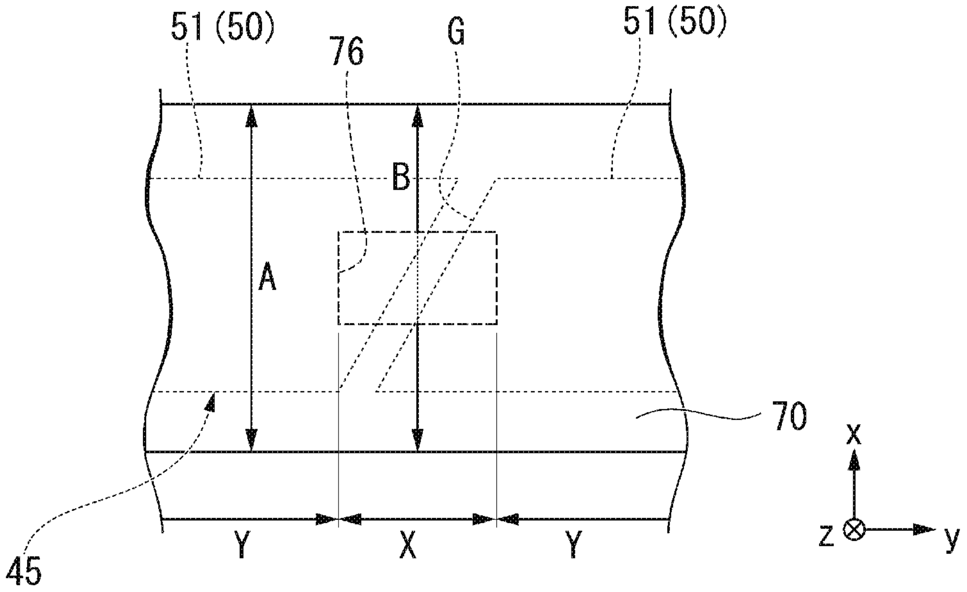
FIG. 15 is a plan view showing a part of a heater unit and a heating element according to a third modification of the first embodiment.

FIG. 15 is a plan view showing a part of a heater unit and the heating elements according to a third modification of the first embodiment.

The heat transfer member 70 of the third modification is formed with a recess 76 instead of the pair of recesses 73 of the first embodiment. The recess 76 is provided in just the first regions X. The recess 76 is opened in a rectangular shape in the facing surface 71. However, entire outer periphery of the recess 76 is surrounded by the contact surface 72. The recess 76 is thus closed (surrounded) by the second surface 42 of the heater unit 40. The recess 76 overlaps the adjacent heating elements 50 in a plan view. The y-direction end of each recess 76 is located at the y-direction edge of the first region X. As a result, the heat transfer member 70 is in contact with the heater unit 40 in the zx cross section in the entire first region X with the second length B shorter than the first length A (since the middle portion of length B is absent from the contacting length), as in the first embodiment. When the contact portion between the heat transfer member 70 and the heater unit 40 is divided on the zx cross section as in this modification, the second length B is taken as the total length of the contacting portions. According to this configuration, the same effect as that of the first embodiment is obtained.

Furthermore, since the entire periphery of recess 76 is surrounded by the contact surface 72 and is closed by the second surface 42 of the heater unit 40, the recess 76 is not exposed (open) to the outside of the fixing device 30. As a result, heat dissipation in the first regions X of the heat transfer member 70 can be suppressed. Therefore, the temperature of the heater unit 40 can be raised more uniformly.

Figure 16:
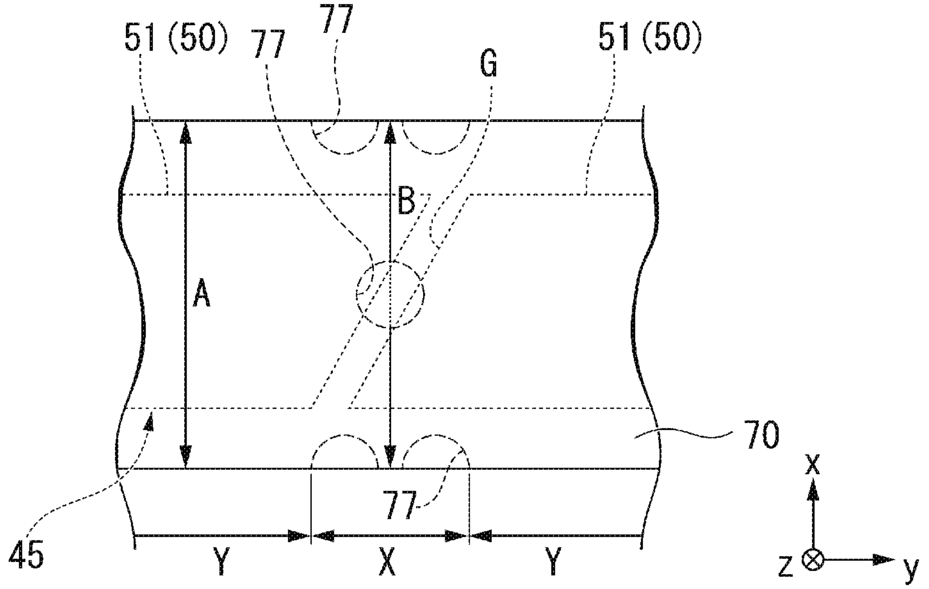
FIG. 16 is a plan view showing a part of a heater unit and a heating element according to a fourth modification of the first embodiment.

FIG. 16 is a plan view showing a part of the heater unit and the heating element according to a fourth modification of the first embodiment.

The heat transfer member 70 of the fourth modification is formed with a plurality of recesses 77 instead of the pair of recesses 73 of the first embodiment. All the recesses 77 are provided in just the first regions X. The entire periphery of at least one recess 77 (center one) is surrounded by the contact surface 72. In the illustrated example, some of the recesses 77 are open to the facing surface 71 in a circular shape. At least one recess 77 overlaps the adjacent heating elements 50 in a plan view. The inner surface of each recess 77 may be formed by a plurality of planes or a curved surface.

The plurality of recesses 77 can be arranged without gaps over the entire first region X when viewed from the x direction in some examples. The heat transfer member 70 can thus be in contact with the heater unit in the zx cross section in the entire first region X with the second length B shorter than the first length A, as in the first embodiment. According to this configuration, the same effect as that of the first embodiment is obtained.

Figure 17:
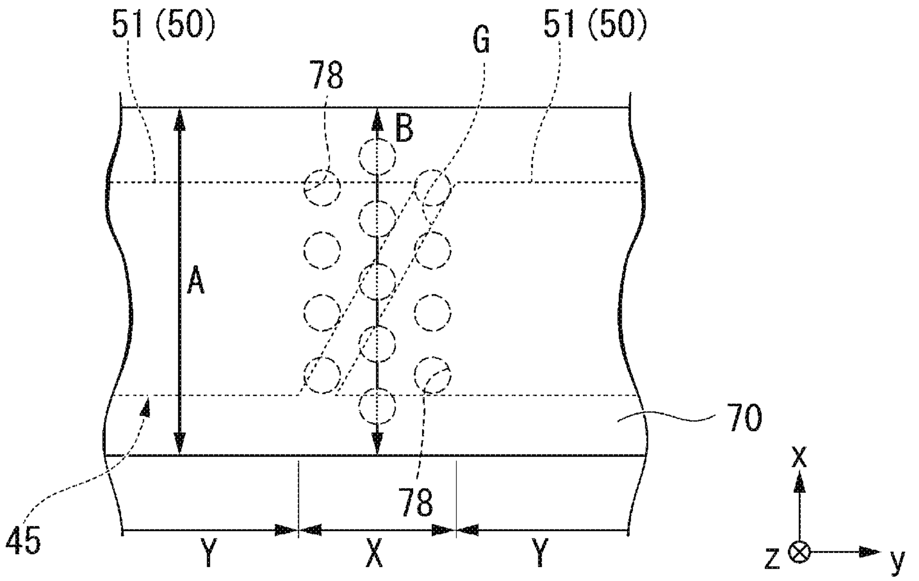
FIG. 17 is a plan view showing a part of a heater unit and a heating element according to a fifth modification of the first embodiment.

FIG. 17 is a plan view showing a part of a heater unit and the heating elements according to a fifth modification of the first embodiment.

The heat transfer member 70 of the fifth modification is formed with a plurality of recesses 78 instead of the pair of recesses 73 of the first embodiment. All the recesses 78 are provided in a first region X. At least one recess 78 is inside the outer edge of the facing surface 71. In the illustrated example, the recess 78 is open to the facing surface 71 in a circular shape. At least one recess 78 overlaps a heating element 50 in a plan view. Among the plurality of recesses 78, the recess 78 located in the most +y direction is located in the −y direction from the end of the first region X in the +y direction. Among the plurality of recesses 78, the recess 78 located in the most to the −y direction is located within the −y direction edge of the first region X. The plurality of recesses 78 are arranged so as to leave a gap therebetween when viewed from the x direction. However, the heat transfer member 70 will be in contact with the heater unit 40 in a part of the first region X in the zx cross section with the second length B shorter than the first length A. In this case as well, the heat transfer member 70 contacts the heater unit 40 in the first region X at the second contact area ratio smaller than the first contact area ratio, as in the first embodiment. According to this configuration, the same effect as that of the first embodiment is obtained.

Figure 18:
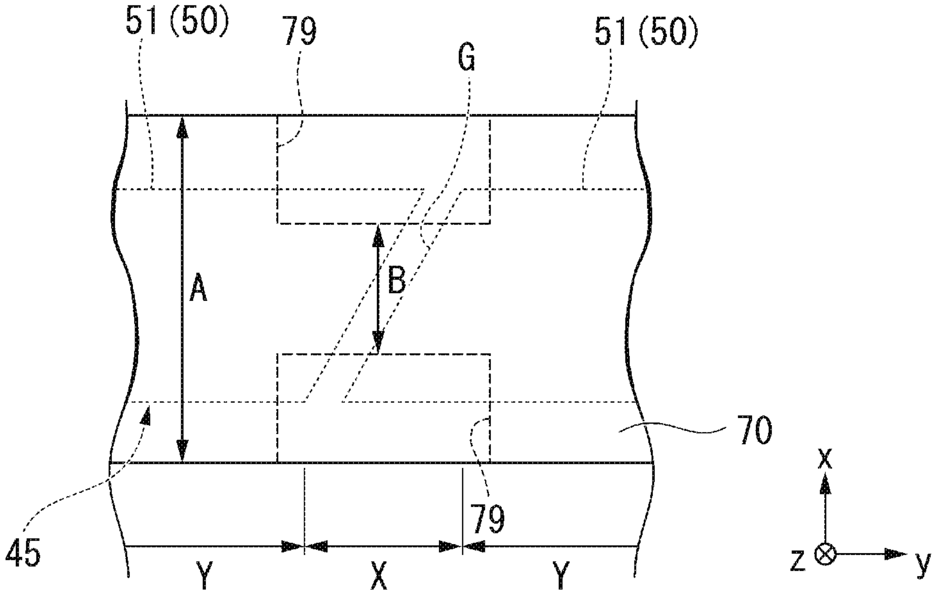
FIG. 18 is a plan view showing a part of a heater unit and a heating element according to a sixth modification of the first embodiment.

FIG. 18 is a plan view showing a part of a heater unit and the heating elements according to a sixth modification of the first embodiment.

The heat transfer member 70 of the sixth modification is formed with a pair of recesses 79 instead of a pair of recesses 73 of the first embodiment. Each recess 79 is provided spanning the first region X into to an adjacent second region Y. The recess 79 overlaps a portion of the adjacent heating elements 50 in a plan view. Both y direction ends of each recess 79 are located within a second region Y. As a result, the heat transfer member 70 is in contact with the second surface 42 of the heater unit 40 with a maximum first length A in the zx cross section in a part of the second region Y. Further, the heat transfer member 70 is in contact with the heater unit 40 in the zx cross section in the entire first region X with the second length B shorter than the first length A. In this case as well, the heat transfer member 70 contacts the heater unit 40 in the first region X at the second contact area ratio smaller than the first contact area ratio as in the first embodiment. According to this configuration, the same effect as that of the first embodiment is obtained.

Figure 19:
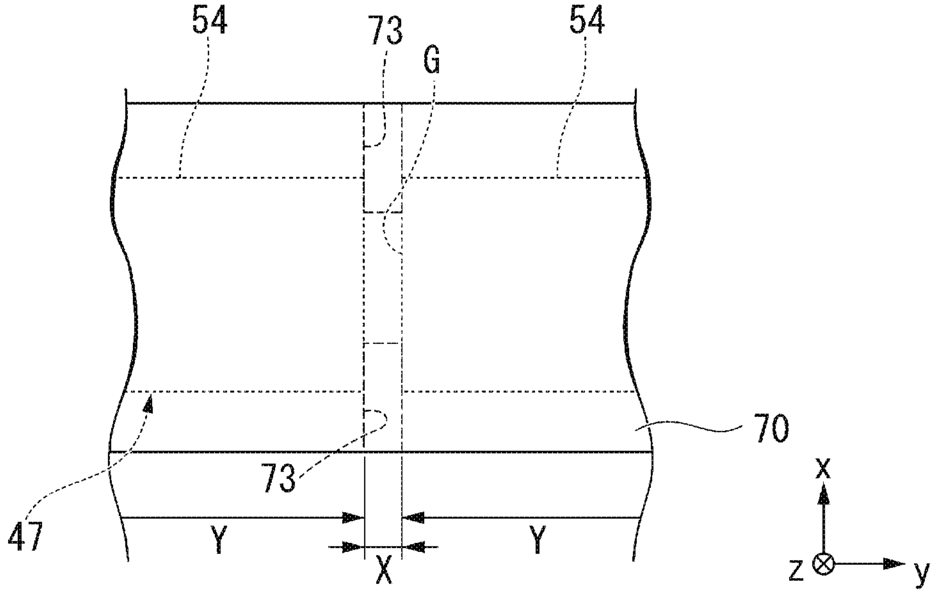
FIG. 19 is a plan view showing a part of a heater unit and a heating element according to a seventh modification of the first embodiment.

FIG. 19 is a plan view showing a part of a heater unit and the heating elements according to a seventh modification of the first embodiment.

The heater unit 40 of the seventh modification is provided with a heating element group 47 instead of the heating element group 45 of the first embodiment. The heating element group 47 includes a plurality of heating elements 54 provided at intervals along the y direction. The interval G left between pairs of adjacent heating elements 54 has a constant width in the y direction. As a result, the pair of adjacent heating elements 54 do not overlap each other when viewed from the x direction. By providing the recesses 73 on the facing surface 71 of the heat transfer member 70 as in the first embodiment, the similar effects as that of explained already for the first embodiment can be obtained.

Second Embodiment

A heat transfer member 170 of the second embodiment will be described. The aspects other than those described below for the second embodiment can be considered to be the same as those of already described for the first embodiment.

Figure 20:
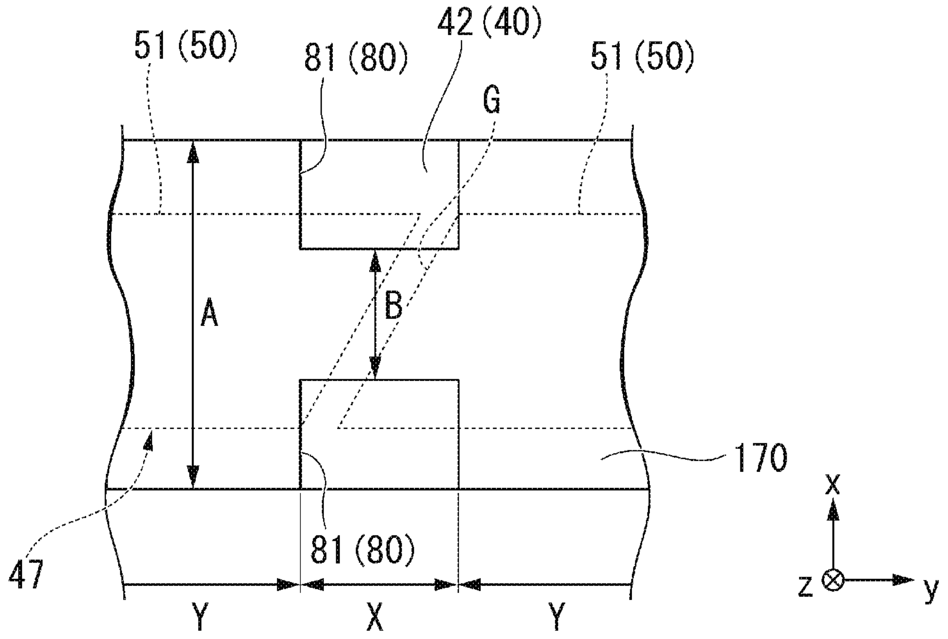
FIG. 20 is a plan view showing a part of a heater unit and a heating element according to a second embodiment.

FIG. 20 is a plan view showing a part of a heater unit 40 and the heating elements 50 according to a second embodiment.

As shown in FIG. 20, a penetrating portion 80 that is adjacent to the contact surface 72 in the first region X. The penetrating portion 80 penetrates through the heat transfer member 170 in the z direction. In the first region X, the penetrating portion 80 extends to the level of the facing surface 71 of the heat transfer member 170. In the present example, penetrating portions 80 are provided at both x direction sides in each first region X. Each penetrating portion 80 reaches in the x direction to the outside side surface of the heat transfer member 170. An opening 81 for each penetrating portion 80 is formed in a rectangular shape in the heat transfer member 170. The opening 81 for the penetrating portion 80 is overlapped by the second surface 42 of the heater unit 40 in a plan view. The opening 81 also overlaps with the adjacent heating elements 50 in a plan view. The y direction end of the opening 81 of each penetrating portion 80 is located at they direction end of the first region X. The penetration portion 80 is formed of a material that has lower thermal conductivity than the heat transfer member 170 overall.

Similar to the heat transfer member 70 of the first embodiment, the heat transfer member 170 is in contact with the heater unit 40 within the first region X with the second length B that is less than the first length A for which the heat transfer member 170 is in contact with heater unit 40 in the second region Y. Specifically, for example, among the contact lengths of the heater unit 40 and the heat transfer member 170 in the zx cross section, the longest contact length in the first region X is shorter than the shortest contact length in the second region Y. As a result, the heat transfer member 170 is in contact with the heater unit 40 in the second region Y with a first contact area ratio. The heat transfer member 170 is in contact with the heater unit 40 in the first region X with a second contact area ratio that is smaller than the first contact area ratio.

As shown in FIG. 12, in the fixing device of Example 2 (corresponding to this second embodiment), a decrease in the glossiness of the first region X with respect to the glossiness of the second region Y is suppressed as compared with the fixing device of the comparative example. As a result, the uneven gloss of the image on the sheet S is suppressed.

As described above, the heat transfer member 170 contacts the heater unit 40 with the first length A in the zx cross section in the second region Y. The heat transfer member 70 contacts the heater unit 40 in the zx cross section in the first region X with the second length B shorter than the first length A. According to this configuration, the contact area of the heat transfer member 170 with respect to the heater unit 40 can be reduced in the first region X as compared with a configuration in which a heat transfer member is evenly contacted with the heater unit 40 without inclusion of the penetrating portions 80 with the heat transfer member. However, with inclusion of the penetrating portions 80, the heat transfer from the heater unit 40 to the heat transfer member 170 is suppressed in the first region X where the degree of heat generation of the heater unit 40 is relatively small as compared with the second region Y. Therefore, the temperature of the heater unit 40 can be raised more uniformly during the initial stage of heating of the heater unit 40 in which the temperature difference between the heater unit 40 and the heat transfer member 170 is relatively large. Therefore, as in the first embodiment, it is possible to suppress the occurrence of an uneven temperature distribution of the heater unit 40.

A penetrating portion 80 that reaches to the level of the contact surface 72 in the first region X is provided. According to this configuration, the contact length between the heater unit 40 and the heat transfer member 170 on the zx cross section passing through the opening 81 for the penetrating portion 80 can be reduced. Therefore, the above-mentioned effect can be obtained.

Modifications of the second embodiment will be described. In general, the aspects other than those described below for a modification can be considered to be the same as those already described for the second embodiment.

Figure 21:
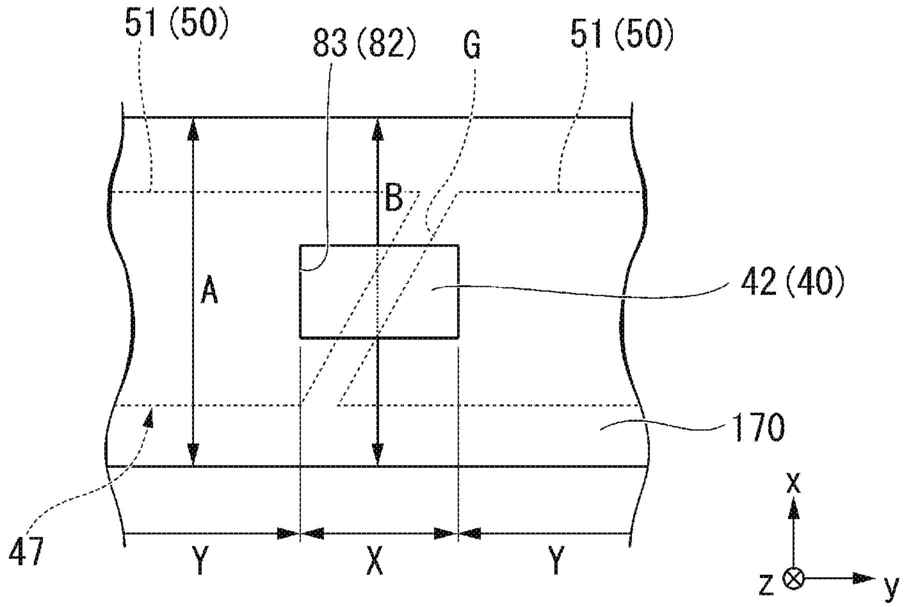
FIG. 21 is a plan view showing a part of a heater unit and a heating element according to a first modification of the second embodiment.

FIG. 21 is a plan view showing a part of a heater unit 40 and the heating elements 50 according to a first modification of the second embodiment.

The first modification has a penetrating portion 82 instead of the pair of penetrating portions 80 of the second embodiment. The penetrating portion 82 is provided in the first region X. The penetrating portion 82 is at the +z direction level of the facing surface 71 of the heat transfer member 170. An opening 83 for the penetrating portion 82 is formed in a rectangular shape. The entire periphery of opening 83 is surrounded by the contact surface 72. The opening 83 overlaps the adjacent heating elements 50 in a plan view. The y-direction end of the opening 83 is located at the y-direction edge of the first region X. As a result, the heat transfer member 170 is in contact with the heater unit 40 in the zx cross section in the first region X with a second length B that is shorter than the first length A. According to this configuration, the same effect as that of the second embodiment can be obtained.

Figure 22:
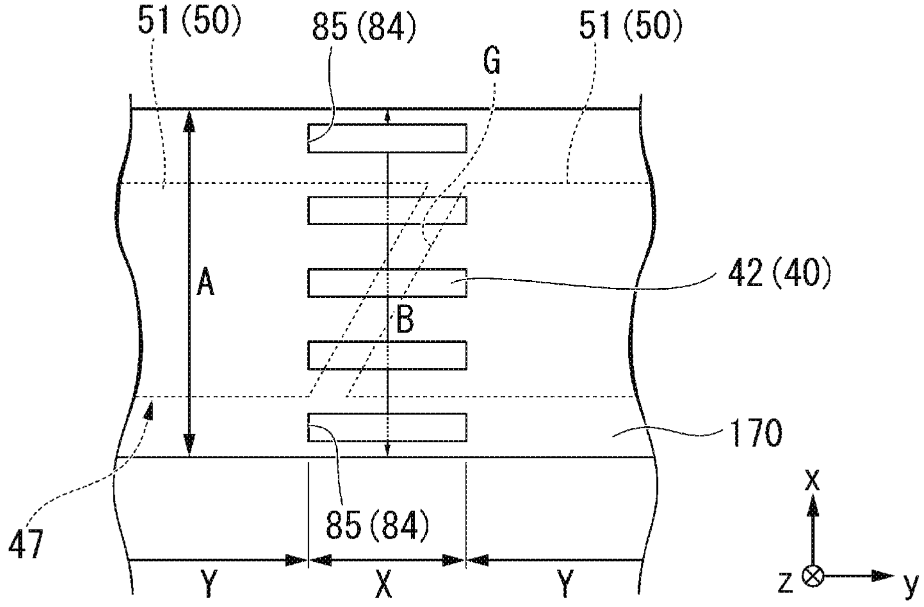
FIG. 22 is a plan view showing a part of a heater unit and a heating element according to a second modification of the second embodiment.

FIG. 22 is a plan view showing a part of a heater unit 40 and heating elements 50 according to a second modification of the second embodiment.

The heat transfer member 170 of the second modification is formed with a plurality of penetrating portions 84 instead of just the pair of penetrating portions 80. All the penetrating portions 84 are provided in the first region X. The penetrating portion 84 are at the +z direction level of the facing surface 71. An opening 85 for each penetrating portion 84 is formed in a rectangular shape with the y direction as the longitudinal direction. The entire periphery of each penetrating portions 84 is surrounded by the contact surface 72. The opening 85 of at least one penetrating portion 84 overlaps the adjacent heating elements 50 in a plan view. The y-direction end of the opening 85 is located at the y-direction edge of the first region X. As a result, the heat transfer member 170 is in contact with the heater unit 40 in the zx cross section in the first region X with a second length B that is shorter than a first length A. According to this configuration, the same effect as that of the second embodiment is obtained.

Similarly to the various modifications of the first embodiment with respect to recess shape, the shape of the opening for the penetrating portion(s) is not particularly limited to any shape. For example, the shape of the opening for the penetrating portion(s) may match the shape of the recess(es) as depicted for in the modifications of the first embodiment.

In the above embodiments and the modifications thereof, the openings of the recesses or for the penetrating portions overlap at least one heating element 50 in a plan view. However, the openings of the recesses and for the penetrating portions do not necessarily have to overlap a heating element 50 in a plan view.

The image processing apparatus of an embodiment is the image forming apparatus 1, and the heating device is a fixing device 30. However, in other examples, the image processing apparatus may be a decolorizing device, and the heating device may be a decolorizing unit. The decolorizing device performs the processing for decolorizing (erasing) an image formed on a sheet with a decolorable toner. The decolorizing unit heats and decolorizes the decolorable toner image formed on the sheet passing through the nip.

According to at least one embodiment described above, a heating element group has a plurality of heating elements spaced at intervals along a row a direction on a first side of a substrate. An interval in the row direction is left between a pair of adjacent heating elements among the plurality of heating elements. There is a region (overlap region) in the heating element group in which end portions of the adjacent heating elements overlap one another in a conveyance direction along the substrate and orthogonal to the row direction. A portion of each heating element outside the overlap region does not overlap with any other heating element in the heating element group in the conveyance direction. A heat transfer member, which is formed of a material with high thermal conductivity, comes into contact with a back side of the substrate. In the overlap region, the heat transfer member contacts the back side of the substrate such that a first contact length of the heat transfer member taken along the conveyance direction is less than a second contact length of the heat transfer member taken along the conveyance direction outside the overlap region. For example, the heat transfer member is formed such that a recess, hole, or protrusion limits contact between the heat transfer member and the back side of the substrate in the first region X as compared to the second region Y. Therefore, heat transfer from the heater unit to the heat transfer member is suppressed in the first region X where the heat generation by the heater unit is relatively small. Therefore, the temperature of the heater unit can be raised more uniformly during an initial stage of heating (startup or the like) of the heater unit for which the temperature difference between the heater unit and the heat transfer member is relatively large. Therefore, it is possible to suppress the occurrence of an uneven temperature distribution in the heater unit.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A heating device, comprising:

a cylindrical film;

a heater disposed inside a region surrounded by the cylindrical film and contacting an inner surface of the cylindrical film, the heater having a plurality of heating elements spaced from each other at intervals along the axial direction of the cylindrical film; and a heat transfer member contacting the heater, wherein the heater is between the cylindrical film and the heat transfer member, in a cross section orthogonal to the axial direction through a first region of the heater including just a single one of the heating elements, the heat transfer member contacts the heater for a first length in a direction perpendicular to the axial direction, and in a cross section orthogonal to the axial direction through a second region of the heater including an interval between a pair of adjacent heating elements, the heat transfer member contacts the heater for a second length in the direction perpendicular to the axial direction, the second length is less than the first length, and the heat transfer member has a recess that is adjacent to the heater in the second region.

2. The heating device according to claim 1, wherein the adjacent pair of heating elements overlap each other in part when viewed from the direction perpendicular to the axial direction.

3. The heating device according to claim 1, wherein the heat transfer member has a plurality of recesses that are adjacent to the heater in the second region.

4. The heating device according to claim 1, wherein the recess extends in the direction orthogonal to the axial direction to an outer edge of the heat transfer member.

5. The heating device according to claim 4, wherein the recess has a semicircular portion in a plane parallel to a surface of the heater.

6. The heating device according to claim 4, wherein the recess has a triangular portion in a plane parallel to a surface of the heater.

7. The heating device according to claim 4, wherein the recess is rectangular in a plane parallel to a surface of the heater.

8. The heating device according to claim 1, wherein the recess is in an interior region of the heat transfer member surrounded by the heat transfer member in all directions within a plane that is parallel to a surface of the heater.

9. The heating device according to claim 8, wherein the recess is circular in the plane.

10. The heating device according to claim 8, wherein the recess is rectangular in the plane.

11. The heating device according to claim 1, further comprising:

a penetrating portion that penetrates through the heat transfer member in the second region and reaches a surface of heater, wherein the penetrating portion has a thermal conductivity that is less than that of the heat transfer member.

12. The heating device according to claim 1, wherein the heat transfer member is metal.

13. A fixing device, comprising:

a fixing belt configured to rotate about an axis;

a heater disposed inside a region surrounded by the fixing belt and contacting an inner surface of the fixing belt, the heater having a plurality of heating elements spaced from each other at intervals along an axial direction of the fixing belt; and a heat transfer member contacting the heater, wherein the heater is between the fixing belt and the heat transfer member, a contact area ratio between the heater and the heat transfer member within a first region of the heater including a single heating element is greater than a contact area ratio between the heater and the heat transfer member within a second region of the heater including an interval between a pair of adjacent heating elements, and the heat transfer member has a recess in a position corresponding to the second region of the heater.

14. The fixing device according to claim 13, wherein the adjacent pair of heating elements overlap each other in part when viewed from a direction orthogonal to the axial direction.

15. The fixing device according to claim 13, further comprising:

a projection portion extending through the heat transfer member in a position corresponding to the second region of the heater, wherein the projection portion has a thermal conductivity that is lower than that of the heat transfer member.

16. The fixing device according to claim 13, wherein the heat transfer member has a plurality of recesses that are adjacent to the heater in the second region.

17. An image processing apparatus, comprising:

a heating device configured to heat a sheet, the heating device including:

a cylindrical film;

a heater disposed inside a region surrounded by the cylindrical film and contacting an inner surface of the cylindrical film, the heater having a plurality of heating elements spaced from each other at intervals along the axial direction of the cylindrical film; and a heat transfer member comprised of metal and contacting the heater, wherein the heater is between the cylindrical film and the heat transfer member, in a cross section orthogonal to the axial direction through a first region of the heater including just a single one of the heating elements, the heat transfer member contacts the heater for a first length in a direction perpendicular to the axial direction, and in a cross section orthogonal to the axial direction through a second region of the heater including an interval between a pair of adjacent heating elements, the heat transfer member contacts the heater for a second length in the direction perpendicular to the axial direction, the adjacent pair of heating elements overlap each other in part when viewed from the direction perpendicular to the axial direction, the second length is less than the first length, and the heat transfer member has a recess that is adjacent to the heater in the second region.

18. The image processing apparatus according to claim 17, further comprising:

a penetrating portion that penetrates through the heat transfer member in the second region and reaches the heater, wherein the penetrating portion has a thermal conductivity that is less than that of the heat transfer member.

19. The image processing apparatus according to claim 17, wherein the heat transfer member has a plurality of recesses that are adjacent to the heater in the second region.

20. The image processing apparatus according to claim 17, wherein the recess extends in the direction perpendicular to the axial direction to an outer edge of the heat transfer member.

* * * * *